United States Patent
Rim et al.

(10) Patent No.: US 8,846,557 B2
(45) Date of Patent: Sep. 30, 2014

(54) CERAMIC COMPOSITION, POROUS CERAMIC HEAT INSULATING MATERIAL USING SAME, AND PREPARATION METHOD THEREOF

(75) Inventors: Jae Young Rim, Gimhae-si (KR); Jeong In Lim, Gimhae-si (KR); Kil Sue Lhim, Gimhae-si (KR)

(73) Assignee: GMatex Co., Ltd., Gimhae, Gyeongsangnam-Do (KR)

( * ) Notice: Subject to any disclaimer, the term of this patent is extended or adjusted under 35 U.S.C. 154(b) by 2 days.

(21) Appl. No.: 13/582,973

(22) PCT Filed: Feb. 17, 2011

(86) PCT No.: PCT/KR2011/001057
§ 371 (c)(1),
(2), (4) Date: Sep. 5, 2012

(87) PCT Pub. No.: WO2011/108817
PCT Pub. Date: Sep. 9, 2011

(65) Prior Publication Data

US 2013/0029129 A1    Jan. 31, 2013

(30) Foreign Application Priority Data

Mar. 5, 2010  (KR) .................. 10-2010-0019640

(51) Int. Cl.
| | | |
|---|---|---|
| *C04B 38/00* | (2006.01) | |
| *C03C 11/00* | (2006.01) | |
| *C04B 28/26* | (2006.01) | |
| *C04B 33/135* | (2006.01) | |
| *C04B 33/13* | (2006.01) | |
| *C04B 111/00* | (2006.01) | |
| *C04B 111/28* | (2006.01) | |

(52) U.S. Cl.
CPC ......... *C04B 28/26* (2013.01); *C04B 2235/3201* (2013.01); *C04B 2111/00612* (2013.01); *C04B 33/1352* (2013.01); *C04B 38/00* (2013.01); *C04B 2235/36* (2013.01); *C04B 2111/28* (2013.01); *C04B 33/13* (2013.01); *C04B 2235/3427* (2013.01)

USPC ............... 501/155; 501/39; 501/84; 264/43; 65/22

(58) Field of Classification Search
USPC ............. 501/39, 155, 84; 65/22; 264/43
See application file for complete search history.

(56) References Cited

U.S. PATENT DOCUMENTS

| | | | |
|---|---|---|---|
| 4,430,108 A * | 2/1984 | Hojaji et al. .................... | 65/22 |
| 5,588,977 A * | 12/1996 | Pavlov et al. .................. | 65/17.4 |
| 5,763,341 A * | 6/1998 | Pavlov et al. .................. | 501/39 |

FOREIGN PATENT DOCUMENTS

| | | |
|---|---|---|
| JP | 2001-328859 A | 11/2001 |
| KR | 10-1991-0000575 A | 1/1991 |

(Continued)

OTHER PUBLICATIONS

Brochure Intercrete 4850 series, no date.*

(Continued)

*Primary Examiner* — Karl Group
(74) *Attorney, Agent, or Firm* — Kile Park Reed & Houtteman PLLC

(57) ABSTRACT

The present invention relates to a ceramic composition and a porous ceramic insulating material comprising the same, which is widely used as a core material in sandwich panels or fire doors. The ceramic composition comprises 44-60 wt % of glass powder, 8-15 wt % of fly ash, 4-8 wt % of surface treatment agent, and 23-29 wt % of water glass. The porous ceramic insulating material manufactured from the composition is lightweight and is an environmentally friendly material which generates no toxic gas when it catches fire. The ceramic insulating material can be produced at a low temperature of 800~900° C., and thus has low production cost. In addition, it can be continuously manufactured in a sheet form.

11 Claims, 3 Drawing Sheets

(56) References Cited

FOREIGN PATENT DOCUMENTS

| KR | 10-0130603 | B1 | | 4/1998 |
|---|---|---|---|---|
| KR | 10-2002-0011267 | A | | 2/2002 |
| WO | 2012044057 | | * | 5/2012 |

OTHER PUBLICATIONS

International Search Report of International Application No. PCT/KR2011/001057, dated Oct. 25, 2011.
Written Opinion of the International Searching Authority for International Application No. PCT/KR2011/001057, dated Oct. 25, 2011.

* cited by examiner

CERAMIC COMPOSITION, POROUS CERAMIC HEAT INSULATING MATERIAL USING SAME, AND PREPARATION METHOD THEREOF

TECHNICAL FIELD

The present invention relates, in general, to a ceramic composition, a porous ceramic insulating material comprising the same and a manufacturing method thereof, and more particularly, to a ceramic composition comprising 44-60 wt % of glass powder, 8-15 wt % of fly ash, 4-8 wt % of surface treatment agent and 23-29 wt % of water glass, and to a porous ceramic insulating material comprising the composition and a manufacturing method thereof.

BACKGROUND ART

Recently, efforts have been made to reduce energy consumption and greenhouse gas emissions. In this respect, in order to reduce energy consumption in the building sector accounting for about 30% of total energy consumption in Korea, studies on novel compositions and insulating materials comprising the same have been actively conducted.

Insulating materials are used to minimize the transfer of heat and can be broadly divided into organic insulating materials and inorganic insulating materials. In Korea, inorganic insulating materials account for about 70% of insulating materials, and inorganic insulating materials are frequently used in applications requiring flame retardant materials.

Table 1 below summarizes various insulating materials and the properties, workability and toxicity of each insulating material.

Referring to Table 1, in the glass wool that is a typical inorganic insulating material, the sealed air layer between the glass fibers provides insulation. The glass wool is noncombustible and absorbs sound, and the effective thickness and insulation property of are not decreased by compression. However, it absorbs water, making it needed to provide a separate damp-proof layer, and gives a tingling feeling to workers.

The polystyrene that is an organic insulating material has a high insulation effect, is lightweight and is easy to use. However, it is weak against UV rays, and is likely to generate toxic gases, which are fatal to the human body, when it catches fire.

In addition, the polyurethane that is another organic insulating material has shortcomings in that the volume and thermal conductivity thereof are reduced after application thereof and in that it is likely to generate toxic gases when it catches fire.

Among insulating materials which are used as core materials in sandwich panels or fire doors, organic insulating materials have excellent insulation properties, but are weak against fire. Due to this problem, these organic insulating materials have no commercial value or are used in limited applications. In addition, inorganic insulating materials have a problem in that they require high-temperature processes, which increase process costs.

Meanwhile, methods of manufacturing ceramic insulating materials using ceramic compositions include a foaming method, which uses gel casting and double emulsion, and a foaming method which uses fly ash, clay and the like as main

TABLE 1

|  | Inorganic materials | | Organic materials | | |
|---|---|---|---|---|---|
|  |  |  | Polystyrene | Polyurethane |  |
|  | Glass wool | Rock wool | (foamed/compressed) | (foamed/hard) | Polyethylene (foamed |
| Properties | Heat-insulating Sound-absorbing Durable Water-repellant | Heat-insulating Sound-absorbing Durable Water-repellant | Insulating Waterproof Adhesive Flame retardant | Insulating Waterproof Adhesive Flame retardant | Heat/electrically insulating Waterproof/chemical-resistant Adhesive/impact-resistant Flame retardant |
| Safe temperature for use (° C.) | 300 | 600 | 70 | 100 | 80 |
| Thermal conductivity (kcal/mh ° C.) | 0.039 | 0.039 | 0.023-0.039 | 0.022-0.025 | 0.03 |
| Water absorption | Absorbing water | Absorbing water | Absorbing a little water | Absorbing a little water | Not absorbing water |
| Noncombustibility | Noncombustible | Noncombustible | Self-extinguishable | Self-extinguishable | Inflammable |
| Workability | 1. easy to treat joints 2. giving a tingling feeling to workers 3. avoided by workers | | 1. difficult to treat joints 2. difficult to treat bent portions and surfaces 3. easy to use | 1. the same as polyethylene 2. expanded in work place | 1. difficult to treat joints 2. difficult to treat bent portions and surfaces 3. easy to use |
| Toxicity | Generating no toxic gas Capable of causing lung cancer | | Generating toxic gases such as $CO$ and $CO_2$ | | |
| Others | Heat and cold insulation | Low priced Heat and cold insulation | Insulating function is reduced with the passage of time in use | Used in refrigerating devices and the like High priced Not constantly supplied Impossible to recycle | |
| Other insulating materials | Foam glass, ALC calcium silicate, gypsum board, vermiculite, diatomite, etc. | | Pelt, plant fibers, foam rubber, urea resin, etc. | | | materials and calcium carbonate ($CaCO_3$) and carbon as foaming agents. Porous insulating materials manufactured by such methods have porous structures which vary depending on the composition of raw materials, physical properties such as particle size, and the kind and content of foaming agent.

In addition, there is a double-calcination method which uses waste glass as a main material and iron trioxide ($Fe_2O_3$) as a foaming agent and in which calcination is repeated to form open pores. A porous insulating material manufactured by this method has small pores.

However, these methods have problems in that specific materials are used in large amounts or a temperature of 1000° C. or higher is generally required, except for modified processes comprising pressurization.

DISCLOSURE

Technical Problem

It is an object of the present invention to provide a ceramic composition and a porous ceramic insulating material comprising the same, in which the ceramic composition has closed pores while maintaining the characteristic function of the ceramic material, and thus has improved properties, including lightweight, insulating and flame retardant properties, and is harmless to the human body and environmentally friendly.

Another object of the present invention is to provide a method for manufacturing a porous ceramic insulating material, the method employing a low-temperature heat-treatment process which reduces the production cost of the insulating material and enables the production of large amounts of the insulating material.

Technical Solution

In order to accomplish the above objects, the present invention provides a ceramic composition comprising 44-60 wt % of glass powder (waste glass powder), 8-15 wt % of fly ash, 4-8 wt % of surface treatment agent, and 23-29 wt % of water glass.

The present invention also provides a porous ceramic insulating material, which comprises said ceramic composition and has a specific gravity of 0.3-0.5 g/cm³, a flexural strength of 40 Kgf/cm² or less, a thermal conductivity of 0.1-0.14 W/mK, and a flame retardance of grade 1.

The present invention also provides a method for manufacturing a porous ceramic insulating material, the method comprising the steps of: mixing the components of said composition to obtain a mixture; drying and powdering the mixture to obtain a powdered material; calcining and foaming the powdered material in a heat-treatment furnace at 800~900° C. for 20 minutes to 3 hours; molding the foamed material into a predetermined shape; naturally cooling the molded material; and cutting and finishing the cooled material according to its intended use.

Advantageous Effects

A porous ceramic insulating material comprising a ceramic composition according to the present invention has advantages of low specific gravity, low thermal conductivity and excellent flame retardance. In addition, the ceramic insulating material is an environmentally friendly material which generates no toxic gas when it catches fire. Moreover, it can be produced at a low temperature of 800~900° C., and thus has low production cost. In addition, it can be continuously manufactured in a sheet form.

The porous ceramic insulating material manufactured by the method of the present invention has a specific gravity of 0.3-0.5 g/cm², a flexural strength of 40 Kgf/cm² or less, a thermal conductivity of 0.1-0.14 W/mK, and a flame retardance of grade 1.

MODE FOR INVENTION

Figure 1A:
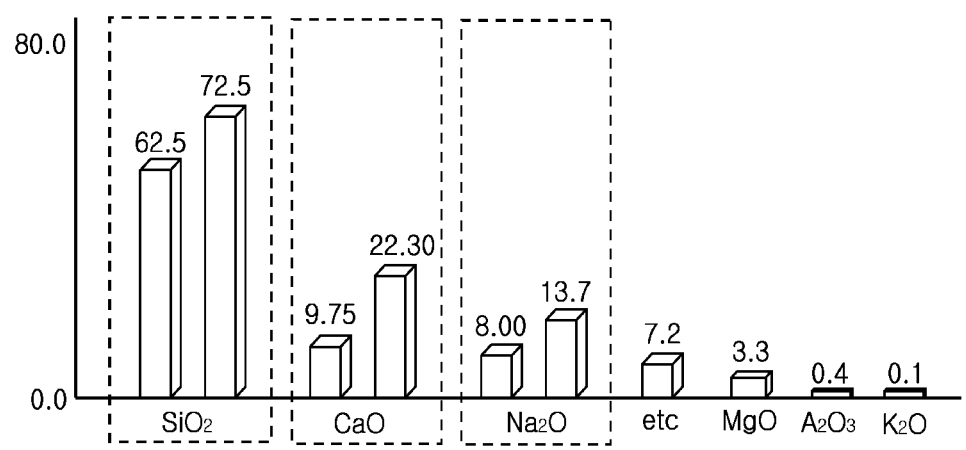
FIG. 1a shows the results of analyzing the components of glass powder in a ceramic composition according to one embodiment of the present invention.

Hereinafter, the present invention will be described in further detail with reference to the accompanying drawings.

TABLE 2

| example | components and contents (wt %) | | heat-treatment conditions | water absorption rate | thermal conductivity (W/M · K) | density (g/cm³) |
|---|---|---|---|---|---|---|
| 1 | glass powder | 46% | 880° C. | low | 0.181 | 0.533 |
|   | Fly Ash | 15% | 3 hours | | | |
|   | surface treating agent | 8% | | | | |
|   | germanium(Ge) | 8% | | | | |
|   | Sodium Silicate | 23% | | | | |
| 2 | glass powder | 52% | | moderate | 0.205 | 0.669 |
|   | Fly Ash | 18% | | | | |
|   | Intercrete | 0% | | | | |
|   | germanium(Ge) | 8% | | | | |
|   | Sodium Silicate | 22% | | | | |
| 3 | glass powder | 38% | | high | — | 0.887 |
|   | Fly Ash | 25% | | | | |
|   | surface treating agent | 4% | | | | |
|   | germanium(Ge) | 8% | | | | |
|   | Sodium Silicate | 25% | | | | |

TABLE 2-continued

| example | components and contents (wt %) | | heat-treatment conditions | water absorption rate | thermal conductivity (W/M · K) | density (g/cm³) |
|---|---|---|---|---|---|---|
| 4 | glass powder | 48% | | high | 0.207 | 0.926 |
| | Fly Ash | 29% | | | | |
| | Sodium Silicate | 23% | | | | |

Table 2 shows water absorption rates, thermal conductivities and specific gravities of ceramic insulating materials manufactured from various compositions having different component ratios.

In example 1 in Table 2, a ceramic insulating material was manufactured from a composition according to the present invention. In example 2, a ceramic insulating material was manufactured from a composition containing no surface treatment agent, and in example 3, a ceramic insulating material was manufactured from a composition containing 25 wt % of fly ash. Meanwhile, in example 4, a ceramic insulating material was manufactured from a composition containing no surface treatment agent and 29 wt % of fly ash.

In examples 1, 2 and 3, 8 wt % of germanium (Ge) was added in order to increase the strength of the ceramic material.

As can be seen in Table 2, only the ceramic insulating material manufactured from the composition of the present invention has a relatively low water absorption rate, a low thermal conductivity of 0.181 W/mK and a low specific gravity of 0.533 g/cm³, suggesting that it is lightweight and, at the same time, has excellent insulation effects.

In order to manufacture the ceramic material of example 1, which has a suitable porosity and contains closed pores having a suitable size, the contents of glass powder, fly ash, surface treatment agent and water glass should be within suitable ranges. In this case, it is possible to manufacture a porous ceramic insulating material, which satisfies the objects of the present invention and has low production cost and improved properties, including lightweight, insulating and flame-retardant properties. Specific reasons why the contents of the components should be in the ranges specified in the present invention will now be described.

The glass powder that is used in the present invention may be not only plain glass powder, but also waste glass powder. The glass powder functions to lower the softening temperature of the composition so that the composition can be foamed at a relatively low temperature. In addition, it functions to improve and maintain the strength of the ceramic material.

In the composition of the present invention, the glass powder is preferably used in an amount of 44-60 wt % based on the total weight of the composition. If the content of the glass powder is less than 44 wt %, the pore size of the ceramic material will decrease while the density will increase, and if the content of the glass powder is more than 60 wt %, the surface of the ceramic material will become glassy and the composition will be excessively foamed.

The fly ash that is used in the present invention is a byproduct of coal combustion and is in the form of fine powder which is collected in a dust collector. It is a typical pozzolanic material, and produces a compound that acts like cement at room temperature, when it is bonded with calcium carbonate and meets water. Currently, fly ash has excellent properties for use as a cement replacement.

In the present invention, the fly ash is preferably used in an amount of 8-15 wt % based on the total weight of the composition. If the content of the fly ash is less than 8 wt %, the composition will be excessively foamed while the strength will decrease, and if it is more than 15 wt %, the foaming of the composition will be significantly inhibited while the pore size will decrease and the density will decrease.

The surface treatment agent that is used in the present invention is used mainly as a cement setting accelerator. The components of the surface treatment agent is similar to those of the glass powder that is used as the main material in the present invention, but the content of calcium carbonate (CaO) thereof is slightly higher than that of conventional glass powder. The surface treatment agent is used to smoothen the surface of the foamed material.

The surface treatment agent functions to improve the surface smoothness of the foamed material, and thus it has the effect of reducing the generation of waste in the cutting and finishing steps when a sheet-like material having a large volume is to be manufactured. In the present invention, the surface treatment agent is preferably used in an amount of 4-8 wt % based on the total weight of the composition.

If the content of the surface treatment agent is less than 4 wt %, the surface layer of the ceramic material will swell up in the foaming step, and thus in the case of a sheet-like foamed material having a large volume, the generation of waste in the cutting step will increase, resulting in an increase in the production cost. If the content of the surface treatment agent is more than 8 wt %, the smoothness of the foamed material will not further increase and the production cost will be increased due to the excessive use of the surface treatment agent.

The water glass that is used in the present invention is an inorganic compound which is most widely used among water-soluble silicates. It is soluble in water. Examples thereof include compounds of alkali metals and silicon dioxide ($SiO_2$) at various molar ratios, including sodium silicate, potassium silicate and lithium silicate, which have a water content of about 10-30%. The water glass is made by melting high-purity sand with sodium carbonate ($Na_2CO_3$) or potassium carbonate at 1100~1200° C.

In the present invention, the water glass is preferably used in an amount of 23-29 wt % based on the total weight of the composition. If the content of the water glass is less than 23 wt %, the foaming of the composition will decrease so that the weight of the composition will increase, and if it is more than 29 wt %, the composition will be excessively foamed so that the surface of the ceramic material will become glassy.

Figure 1B:
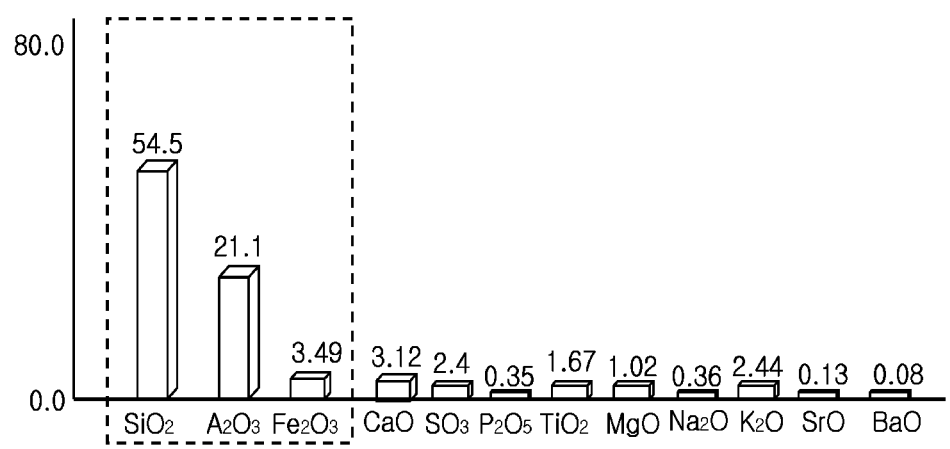
FIG. 1b shows the results of analyzing the components of fly ash in a ceramic composition according to one embodiment of the present invention.
Figure 1C:
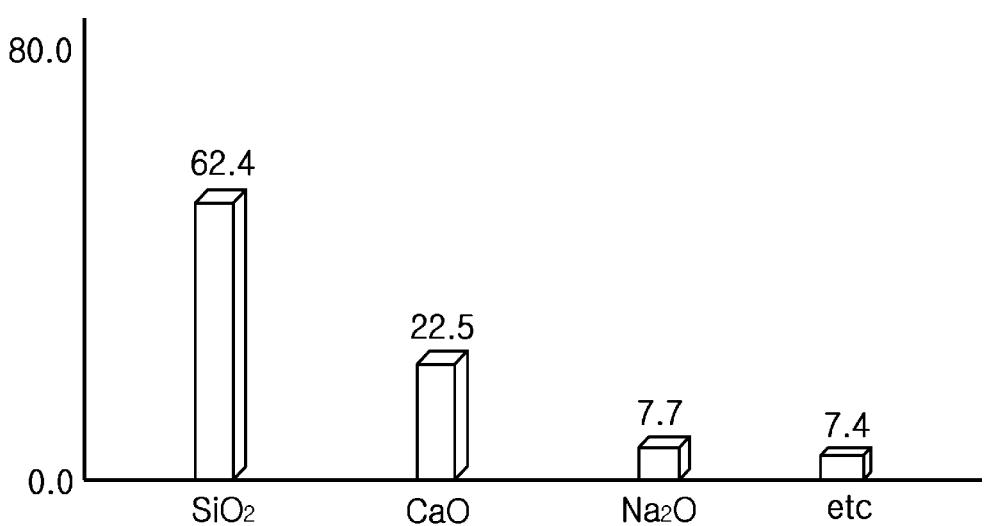
FIG. 1c shows the results of analyzing the components of surface treatment agent in a ceramic composition according to one embodiment of the present invention.

FIGS. 1a, 1b and 1c show the results of analyzing the components of each of glass powder, fly ash and surface treatment agent in a ceramic composition according to one embodiment of the present invention.

As shown in FIG. 1a, glass powder contains 62.50-72.50 wt % of silicon dioxide ($SiO_2$), 9.75-22.30 wt % of calcium oxide (CaO), 8.00-13.70 wt % of sodium oxide ($Na_2O$), and 3.8-7.2 wt % of other components, including magnesium oxide (MgO), alumina ($Al_2O_3$) and potassium oxide ($K_2O$).

As shown in FIG. 1b, fly ash contains 54.5 wt % of $SiO_2$, 21.2 wt % of alumina ($Al_2O_3$) and 3.49 wt % of iron trioxide, as well as other components, including calcium oxide (CaO), sulfur trioxide ($SO_2$), phosphorus pentoxide ($P_2O_5$), titanium dioxide ($TiO_2$), sodium oxide ($Na_2O$), strontium oxide (SrO) and barium oxide (BaO).

As shown in FIG. 1c, surface treatment agent contains 62.40 wt % of silicon dioxide ($SiO_2$), 22.5 wt % of calcium oxide (CaO) and 7.70 wt % of sodium oxide ($Na_2O$).

Figure 2:
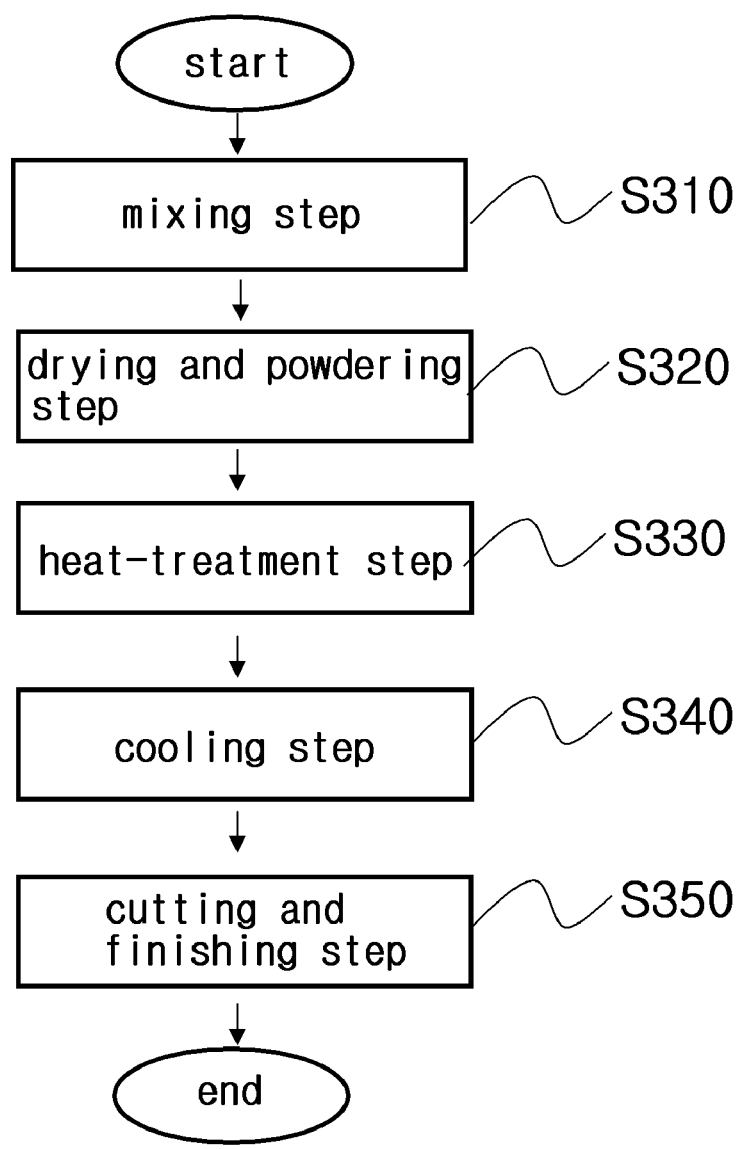
FIG. 2 is a flow diagram showing a process of manufacturing a porous ceramic insulating material using a ceramic composition according to the present invention.

FIG. 2 is a flow diagram showing a process of manufacturing a porous ceramic insulating material using a ceramic composition according to the present invention. As shown in FIG. 2, the inventive method for manufacturing the porous ceramic insulating material comprises a mixing step S310, a drying and powdering step S320, a heat-treatment step S330, a cooling step S340 and a cutting and finishing step S350.

In the mixing step S310, 44-60 wt % of glass powder (or waste glass powder) is mixed with 8-15 wt % of fly ash, 4-8 wt % of surface treatment agent and 23-29 wt % of water glass. In the drying and powdering step S320, the mixture is dried and powdered.

In the heat-treatment step S330, the powdered material is calcined and foamed. In this step, calcination and foaming can be performed at a low temperature of 800~900° C., and thus the production cost can be reduced. The foamed material is molded into a predetermined shape such as a sheet.

In the cooling step S340, the molded material is cooled. Herein, the cooling is preferably natural cooling, but when a large amount of the ceramic material is produced, forced air cooling may also be carried out at a specific temperature or lower in order to reduce the drying time, thus reducing the total process time.

In the cutting and finishing step S350, the dried material is cut and finished according to the intended use. A large sheet-like material (950×650 mm) can be continuously manufactured and can be used as a core material in various products.

Until now, research and development similar to the present invention has been performed in various areas, including the academic world, but the developed molded materials are still in the research stage and are mostly laboratory-scale samples having a small volume. Moreover, even if molded materials having a large volume were developed, they had low pore size uniformity for various reasons, particularly the non-uniform properties of each of the raw materials.

For example, if thorough tracking of the place in which a mineral is produced is not performed, the uniformity of the properties of a product comprising the mineral cannot be guaranteed.

The present inventors have performed the thorough tracking of each raw material and have made extensive efforts to find a method of managing the properties of each raw material and to determine the most suitable conditions (e.g., the content of each raw material, and heat-treatment temperature) while experiencing a lot of trial and error, and as a result, could manufacture a molded material having a large volume by a continuous manufacturing process. Thus, a basis for producing a large amount of a porous ceramic insulating material could be established according to the present invention.

As described above, according to the manufacturing method of the present invention, a porous ceramic insulating material can be manufactured, which has closed pores and shows excellent properties, including lightweight, insulating and flame-retardant properties. In addition, a large sheet-like insulating material can be manufactured by a continuous process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A ceramic composition comprising:
   44.00-60.00 wt % of glass powder;
   8.00-15.00 wt % of fly ash;
   4.00-8.00 wt % of a surface treatment agent as a mixture comprising 62.40 wt % of silicon dioxide ($SiO_2$), 22.50 wt % of calcium oxide (CaO), 7.70 wt % of sodium oxide ($Na_2O$) and 7.40 wt % of other; and
   23.00-29.00 wt % of water glass.

2. The ceramic powder of claim 1, wherein the glass powder comprises:
   62.50-72.50 wt % of silicon dioxide ($SiO_2$);
   9.75-22.30 wt % of calcium oxide (CaO); and
   8.00-13.70 wt % of sodium oxide ($Na_2O$).

3. The ceramic composition of claim 2, wherein the fly ash comprises:
   54.5 wt % of silicon dioxide ($SiO_2$);
   21.1 wt % of alumina ($Al_2O_3$); and
   3.49 wt % of iron trioxide ($Fe_2O_3$).

4. The ceramic composition of claim 1, wherein the glass powder is waste glass powder.

5. A porous ceramic insulating material, which comprises the ceramic composition of claim 1 and has a specific gravity of 0.3-0.5 g/cm$^3$, a flexural strength of 40 Kgf/cm$^2$ or less, a thermal conductivity of 0.1-0.14 W/mK, and a flame retardance of grade 1.

6. A method for manufacturing a porous ceramic insulating material comprising the ceramic composition set forth in claim 1, the method comprising the steps of:
   mixing components of said composition to obtain a mixture;
   drying and powdering the mixture to obtain a powdered material;
   heat-treating the powdered material so as to be calcined and foamed;
   molding the heat-treated material into a predetermined shape;
   cooling the molded material; and
   cutting and finishing the cooled material.

7. The method of claim 6, wherein the heat-treating step is carried out at 800~900° C. for 20 minutes to 3 hours.

8. The method of claim 6, wherein, in the step of mixing the components of the composition, germanium (Ge) is further added in addition to said glass powder, fly ash, surface treatment agent and water glass.

9. A method for manufacturing a porous ceramic insulating material comprising the ceramic composition set forth in claim 2, the method comprising the steps of:
   mixing components of said composition to obtain a mixture;
   drying and powdering the mixture to obtain a powdered material;
   heat-treating the powdered material so as to be calcined and foamed;
   molding the heat-treated material into a predetermined shape;
   cooling the molded material; and
   cutting and finishing the cooled material.

10. A method for manufacturing a porous ceramic insulating material comprising the ceramic composition set forth in claim 3, the method comprising the steps of:
    mixing components of said composition to obtain a mixture;

drying and powdering the mixture to obtain a powdered material;

heat-treating the powdered material so as to be calcined and foamed;

molding the heat-treated material into a predetermined shape;

cooling the molded material; and cutting and finishing the cooled material.

11. A method for manufacturing a porous ceramic insulating material comprising the ceramic composition set forth in claim 4, the method comprising the steps of:

mixing components of said composition to obtain a mixture;

drying and powdering the mixture to obtain a powdered material;

heat-treating the powdered material so as to be calcined and foamed;

molding the heat-treated material into a predetermined shape;

cooling the molded material; and cutting and finishing the cooled material.

* * * * *

UNITED STATES PATENT AND TRADEMARK OFFICE
CERTIFICATE OF CORRECTION

| | |
|---|---|
| PATENT NO. | : 8,846,557 B2 |
| APPLICATION NO. | : 13/582973 |
| DATED | : September 30, 2014 |
| INVENTOR(S) | : Jae Young Rim, Jeong In Lim and Kil Sue Lhim |

It is certified that error appears in the above-identified patent and that said Letters Patent is hereby corrected as shown below:

Title page, item [73]; Assignee change "GMatex Co., Ltd." to "GMATEK CO., LTD.".

Signed and Sealed this
Thirty-first Day of March, 2015

Michelle K. Lee
*Director of the United States Patent and Trademark Office*